US011150202B2

(12) United States Patent
Tsuboi et al.

(10) Patent No.: US 11,150,202 B2
(45) Date of Patent: Oct. 19, 2021

(54) X-RAY IMAGING SYSTEM

(71) Applicant: Konica Minolta, Inc., Tokyo (JP)

(72) Inventors: Yasunori Tsuboi, Hino (JP); Hiromichi Shindou, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 258 days.

(21) Appl. No.: 16/380,266

(22) Filed: Apr. 10, 2019

(65) Prior Publication Data
US 2019/0317027 A1   Oct. 17, 2019

(30) Foreign Application Priority Data
Apr. 12, 2018   (JP) .............................. JP2018-076493

(51) Int. Cl.
| | | |
|---|---|---|
| *G01N 23/04* | (2018.01) | |
| *G06T 7/00* | (2017.01) | |

(52) U.S. Cl.
CPC ........... *G01N 23/04* (2013.01); *G06T 7/0012* (2013.01); *G01N 2223/309* (2013.01); *G01N 2223/321* (2013.01); *G01N 2223/401* (2013.01); *G01N 2223/408* (2013.01); *G01N 2223/615* (2013.01); *G01N 2223/646* (2013.01); *G06T 2207/10116* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,519,390 | B2* | 8/2013 | Liao ...................... | H01L 22/12 257/48 |
| 2006/0022235 | A1* | 2/2006 | Kanbe ............... | H01L 27/14843 257/294 |
| 2009/0295803 | A1* | 12/2009 | Young ...................... | G06T 3/40 345/424 |
| 2012/0134561 | A1* | 5/2012 | Xu .......................... | G06T 5/002 382/131 |
| 2012/0140882 | A1* | 6/2012 | Iwakiri ................. | A61B 6/502 378/62 |

(Continued)

FOREIGN PATENT DOCUMENTS

| | | |
|---|---|---|
| JP | 2015124846 A | 7/2015 |
| JP | 2016108683 A | 6/2016 |

*Primary Examiner* — Zhiyu Lu
(74) *Attorney, Agent, or Firm* — Cantor Colburn LLP

(57) ABSTRACT

An X-ray imaging system includes the following. An X-ray Talbot imaging apparatus includes an X-ray source, a plurality of gratings, and an X-ray detector. An X-ray is irradiated from the X-ray source through the examined target which is an object and the plurality of gratings and to the X-ray detector to obtain a moire image necessary to generate the reconstructed image of the examined target. A first database shows, for each name or type of material, a correlation between information regarding a signal strength in the reconstructed image generated based on the moire image and quality information of the material included in the examined target. A controller estimates as the evaluation index the quality information in the examined target from the reconstructed image based on information regarding the input name or the type of material and input shape information and the first database.

11 Claims, 9 Drawing Sheets

(56) References Cited

U.S. PATENT DOCUMENTS

| | | | |
|---|---|---|---|
| 2012/0140884 A1* | 6/2012 | Iwakiri | A61B 6/4291 378/62 |
| 2012/0140885 A1* | 6/2012 | Iwakiri | A61B 6/4291 378/62 |
| 2012/0145912 A1* | 6/2012 | Iwakiri | A61B 6/06 250/370.08 |
| 2012/0153177 A1* | 6/2012 | Iwakiri | A61B 6/4021 250/370.09 |
| 2013/0230135 A1* | 9/2013 | Hoshino | A61B 6/04 378/36 |
| 2015/0235725 A1* | 8/2015 | Makifuchi | A61B 6/484 378/87 |
| 2015/0260663 A1* | 9/2015 | Yun | G21K 1/02 378/36 |
| 2016/0042533 A1* | 2/2016 | Kiyohara | G06T 11/006 382/103 |
| 2016/0229120 A1* | 8/2016 | Levine | B33Y 30/00 |
| 2016/0338659 A1* | 11/2016 | Hoshino | A61B 6/032 |
| 2016/0379353 A1* | 12/2016 | Makifuchi | A61B 6/5211 382/131 |

* cited by examiner

X-RAY IMAGING SYSTEM

CROSS REFERENCE TO RELATED APPLICATIONS

The present invention claims priority under 35 U.S.C. § 119 to Japanese Patent Application No. 2018-076493 filed on Apr. 12, 2018 is incorporated herein by reference in its entirety.

BACKGROUND

1. Technological Field

The present invention relates to an X-ray imaging system.

2. Description of the Related Art

Lately, composite material is used as various components in products such as space crafts, air crafts, automobiles, ships, fishing rods, electric components, appliance components, parabola antennae, bathtubs, floor material, roof material and the like. Well known composite material include, FRP (fiber reinforced plastic) including carbon fibers or glass fibers as reinforcing fibers such as CFRP (carbon fiber reinforced plastic), CFRTP (carbon fiber reinforced thermoplastic), GFRP (glass fiber reinforced plastic) or CMC (ceramic matrix composites) including ceramic fiber as reinforcing material.

In such composite material, not only the material quality itself but also the fine internal structure of the material has a great influence on the mechanical characteristics of the component. For example, the CFRP has a three-dimensional structure due to the weave or the orientation of the carbon fibers, and the fiber orientation, the fiber density, or the amount of defects greatly influence the mechanical strength. Therefore, various methods to test or evaluate the composite material or the various components using the composite material are disclosed.

For example, Japanese Patent Application Laid-Open Publication No. 2015-124846 discloses a method to quantitatively examine a degree of orientation of the fibers for fiber bundles in which thermoset resin such as epoxy resin is impregnated. The fiber bundles are wrapped around the outer circumference of the liner of the tank which is a hollow container made from resin material such as nylon resin.

For example, Japanese Patent Application Laid-Open Publication No. 2016-108683 discloses a method to estimate surface pressure of a holding seal material including inorganic fiber. The fiber orientation degree index is measured in the thickness direction of the holding seal, and when the fiber orientation degree index is no more than a predetermined value, the holding seal is determined to be a conforming product.

In order to understand the fine structure of the composite material, it is necessary to understand the internal structure by a three-dimensional image reconstructing unit such as computer tomography (CT). However, in order to reconstruct a three-dimensional image with the CT, a large amount of two-dimensional images need to be imaged and complicated reconstructing processing needs to be performed. Therefore, there is a problem that the examination is time consuming. Moreover, the workpiece needs to be rotated three-dimensionally. Therefore, it is unrealistic to examine large components or large pieces of material. In order to acquire the resolution, the expansion rate of the image needs to be largely acquired. Therefore, the square area that can be examined at once becomes very small.

SUMMARY

The object of the present invention is to be able to examine a large square area of the structure of the examined target at once within a short time from a small amount of two-dimensional reconstructed images and to be able to examine a large sized examined target without using a rotating mechanism To achieve at least one of the abovementioned objects, according to an aspect of the present invention, an X-ray imaging system reflecting one aspect of the present invention is described, the X-ray imaging system which estimates an evaluation index used when quality determination of an examined target is performed based on a reconstructed image of the examined target imaged by an X-ray Talbot imaging apparatus, the X-ray imaging system including: an X-ray Talbot imaging apparatus which includes an X-ray source, a plurality of gratings, and an X-ray detector provided aligned in an X-ray irradiating axis direction, wherein an X-ray is irradiated from the X-ray source through the examined target which is an object and the plurality of gratings and to the X-ray detector to obtain a moire image necessary to generate the reconstructed image of the examined target; a controller; and a first database which shows, for each name or type of material, a correlation between information regarding a signal strength in the reconstructed image generated based on the moire image and quality information of the material included in the examined target, wherein the controller estimates as the evaluation index the quality information regarding an area of interest in the examined target from the reconstructed image based on information regarding the input name or the type of material and input shape information and the first database.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
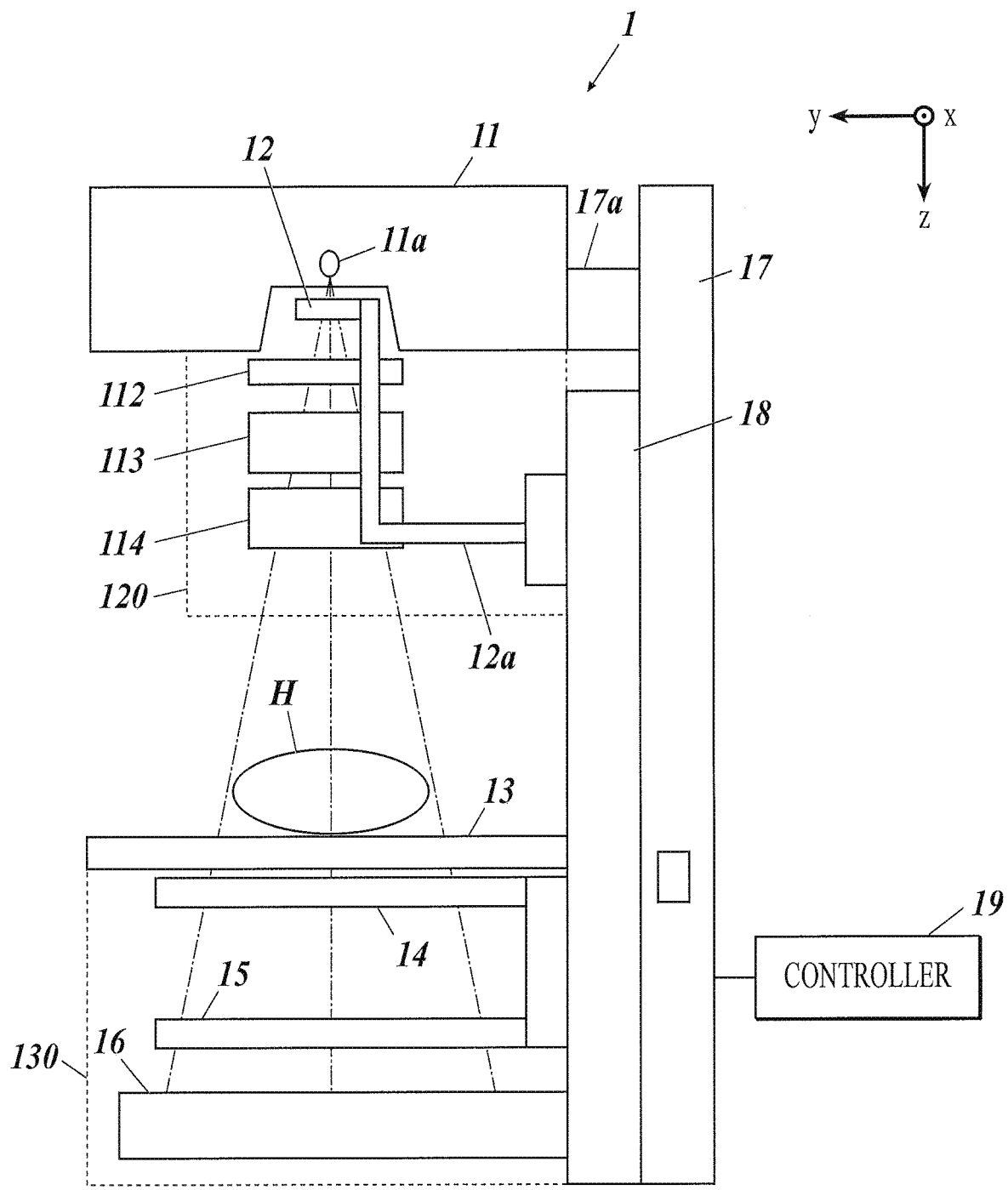
FIG. 1 is a schematic diagram showing an overall image of an X-ray Talbot imaging apparatus and an object housing unit.

Hereinafter, one or more embodiments of the present invention will be described with reference to the drawings. The embodiments described below include various technically preferable limitations to implement the present invention. However, the scope of the invention is not limited to the disclosed embodiments.

The present embodiment describes an X-ray imaging system in order to estimate an evaluation index used when quality determination is performed for an examined target based on a reconstructed image of an examined target which is an object H imaged by an X-ray Talbot imaging apparatus 1.

Various processes such as estimating the evaluation index is performed by a controlling apparatus 20 connected to the X-ray Talbot imaging apparatus 1.

[Object]

The object H according to the present embodiment includes a composite material, and the composite material is used as various components in products such as space crafts, air crafts, automobiles, ships, fishing rods, electric components, appliance components, parabola antennae, bathtubs, floor material, roof material and the like.

Well known composite material include, FRP (fiber reinforced plastic) including carbon fibers or glass fibers as reinforcing fibers such as CFRP (carbon fiber reinforced plastic), CFRTP (carbon fiber reinforced thermoplastic), GFRP (glass fiber reinforced plastic) or CMC (ceramic matrix composites) including ceramic fiber as reinforcing material. In a broad sense, composite material including various types of wood such as plywood may also be included. Other than the above, composite materials not including fiber such as MMC (metal matrix composites) concrete, reinforced concrete can be included.

The materials (referred to as composite materials described above) included in the examined target which is the object H have different characteristics (mechanical strength) according to its type, and the data for each type is stored and accumulated in a system (later described storage 23). Therefore, when various processes such as estimate of the evaluation index are performed, it is necessary to specify a name of the material (material name) or information regarding a classification of the material.

The mechanical strength is different according to the shape and for the shape information of the material also, the data is stored and accumulated for each shape in the system (later described storage 23). When various processes such as estimate of the evaluation index is performed, the shape information of the material needs to be specified.

The mechanical strength includes, for example, elastic modulus, yield strength, plasticity, tensile strength, stretch, fracture energy, hardness, etc.

The shape information mainly includes thickness information (thickness dimensions), CAD data, and three-dimensional (3D) data such as data measured by a three-dimensional measuring device. Other shape information include, position of unevenness in the material, whether the material is in a net shape, and whether the material is layered, for example.

Then, when the name and the shape information of the material are specified to perform the various processes such as estimating the evaluation index, input from a later described inputting unit 24 or input from an external apparatus through a later described external data inputting unit 25 is performed.

[X-Ray Talbot Imaging Apparatus]

According to the present embodiment, an X-ray Talbot imaging apparatus using a Talbot-Lau interferometer including a radiation source grating (also called multi-grating, multi slit, G0 grating) 12 is employed as the X-ray Talbot imaging apparatus 1. Alternatively, the X-ray Talbot imaging apparatus using the Talbot-Lau interferometer which is not provided with the radiation source grating 12 and which is only provided with a first grating (also called G1 grating) 14 and a second grating (also called G2 grating) 15 can also be employed.

FIG. 1 is a schematic diagram showing an overall image of the X-ray Talbot imaging apparatus 1.

The X-ray Talbot imaging apparatus 1 according to the present embodiment includes an X-ray generating apparatus 11, the above-described radiation source grating 12, an object stage 13, the above-described first grating 14, the above-described second grating 15, an X-ray detector 16, a supporting pole 17, and a base 18.

According to such X-ray Talbot imaging apparatus 1, at least three types of images (two-dimensional images) can be reconstructed (called reconstructed image) by imaging a moire image Mo of the object H in a predetermined position on the object stage 13 with a method based on a principle of fringe scanning method or by analyzing the moire image Mo using a Fourier transform method. That is, there are three types of images, an absorption image (same as normal X-ray absorption image) which forms an image with an average component of a moire fringe in the moire image Mo, a differential phase image which forms an image with phase information of the moire fringe, and a small-angle scattering image which forms an image using visibility of the moire fringe. The three types of reconstructed images can be composited again to generate many types of images.

In the fringe scanning method, one of the plurality of gratings is moved in a unit of 1/M of the slit cycle of the grating (M is a positive integer, the absorption image is M>2, the differential phase image and the small-angle scattering image is M>3) in the slit cycle direction and reconstructing is performed using the moire image Mo imaged M times. With this, a high definition reconstructed image is obtained.

In the Fourier transform method, the X-ray Talbot imaging apparatus images one moire image Mo of the object. In the image processing, the Fourier transform method is performed on the moire image Mo to reconstruct the differential phase image, etc. and to generate the image.

Here, the principle common to the Talbot interferometer and the Talbot-Lau interferometer is described with reference to FIG. 2.

Figure 2:
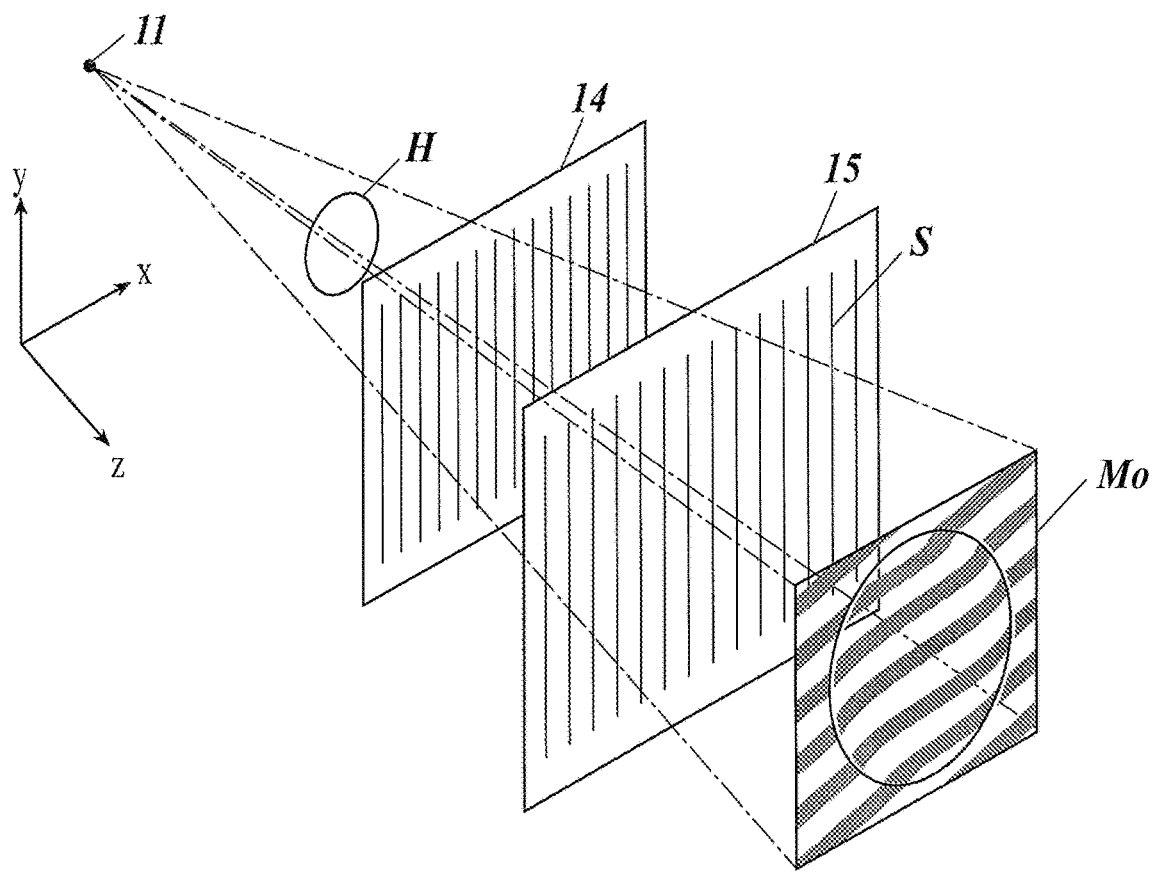
FIG. 2 is a diagram describing a principle of a Talbot interferometer.

FIG. 2 shows the Talbot interferometer but the same description basically applies for the Talbot-Lau interferometer. A z-direction shown in FIG. 2 corresponds to a vertical direction in the X-ray Talbot imaging apparatus 1 shown in FIG. 1, and an x-direction and a y-direction shown in FIG. 2 correspond to a horizontal direction (front and back direction, left and right direction) in the X-ray Talbot imaging apparatus 1 shown in FIG. 1.

Figure 3:
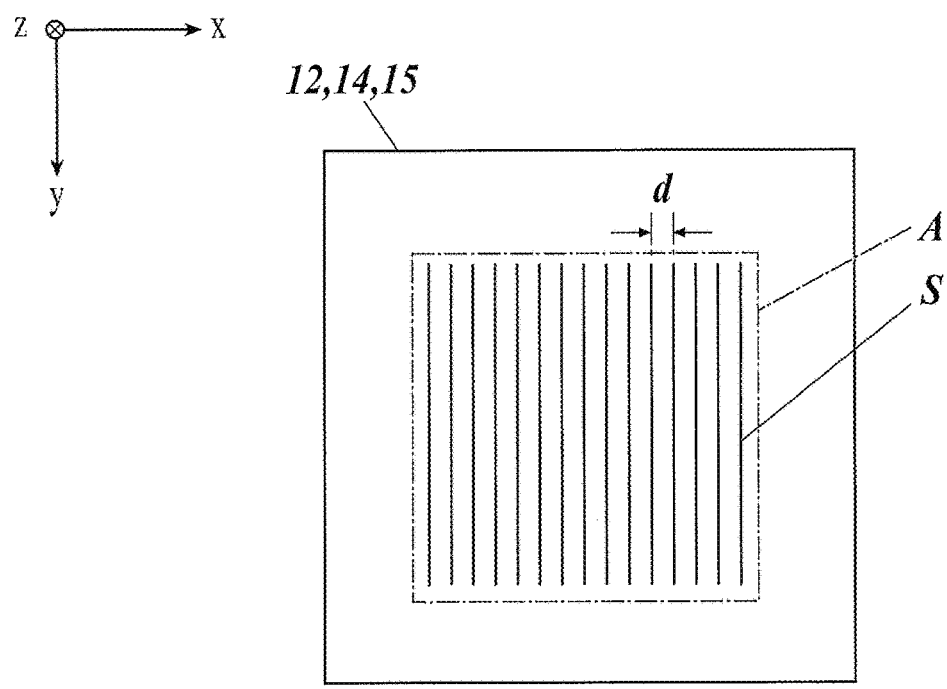
FIG. 3 is schematic flat view showing a radiation source grating, a first grating, and a second grating.

As shown in FIG. 3, in the first grating 14 and the second grating 15, (in the Talbot-Lau interferometer, the radiation source grating 12 also) a plurality of slits S are formed arranged in a predetermined cycle d in the x-direction orthogonal to the z-direction which is the irradiating direction of the X-ray. The array of such slits S is to be a one-dimensional grating, and when the slits S are formed arrayed in the x-direction and the y-direction, this is to be a two-dimensional grating.

In the radiation source grating 12, the first grating 14, and the second grating 15 according to the present embodiment, a one-dimensional grating is employed, but when a detailed evaluation accuracy is not necessary for the fiber orientation, a two-dimensional grating may be employed.

As shown in FIG. 2, when the X-ray (in a Talbot-Lau interferometer, the X-ray irradiated from the X-ray source 11A and multiplied with the radiation source grating 12 (not shown in FIG. 2)) irradiated from an X-ray source 11a passes the first grating 14, the X-ray which passed forms an image at a certain interval in the z-direction. This image is called a self-image (also called grating image), and such effect in which the self-image is formed in the z-direction in a certain interval is called the Talbot effect.

That is, according to the Talbot effect, when the coherent light passes the first grating 14 in which the slit S is provided in a certain cycle d as shown in FIG. 3, a self-image is made at a certain interval in a light advancing direction.

Then, as shown in FIG. 2, the second grating 15 provided with the slit S similar to the first grating 14 is positioned in the position that the self-image of the first grating 14 is made. Here, when the second grating 15 is positioned so that the extending direction of the slit S in the second grating 15 (that is, x-axis direction in FIG. 2) is substantially parallel to the extending direction of the slit S in the first grating 14, the moire image Mo can be obtained on the second grating 15.

It becomes difficult to understand if the moire image Mo is described on the second grating 15 in FIG. 2 because the moire fringe and the slit S are mixed. Therefore, in FIG. 2, the moire image Mo is described separated from the second grating 15. However, actually, the moire image Mo is formed on the second grating 15 and in the downstream side of the second grating 15. Then, the moire image Mo is imaged with the X-ray detector 16 directly below the second grating 15.

As shown in FIG. 1 and FIG. 2, when there is an object H between the X-ray source 11a and the first grating 14, the phase of the X-ray is shifted by the object H, and the moire fringe of the moire image Mo is disturbed with the outline of the object H as the boundary. Although illustration is omitted, if there is no object H between the X-ray source 11a and the first grating 14, there is a moire image Mo with only the moire fringe. This is the principle of the Talbot interferometer and the Talbot-Lau interferometer.

According to this principle, in the X-ray Talbot imaging apparatus 1 according to the present embodiment, for example, as shown in FIG. 1, the second grating 15 is positioned in a position where the self-image of the first grating 14 is formed in the second cover unit 130. As described above, since the moire image Mo (see FIG. 2) is blurred when the second grating 15 and the X-ray detector 16 are separated, the X-ray detector 16 is positioned directly below the second grating 15 in the present embodiment. The second grating 15 may include a light emitting material such as a scintillator or amorphous selenium, and the second grating 15 may be formed as one with the X-ray detector 16.

The second cover unit 130 is provided to protect the X-ray detector 16, etc. so that a person or thing does not hit or touch the first grating 14, the second grating 15, or the X-ray detector 16.

Although illustration is omitted, in the X-ray detector 16, the conversion elements which generate the electric signals according to the irradiated X-ray are positioned in a two-dimensional shape (matrix shape) and the electric signals generated by the conversion elements are read as image signals. Then, according to the present embodiment, the X-ray detector 16 images the moire image Mo which is the image of the X-ray formed on the second grating 15 as the image signal from each conversion element. The pixel size of the X-ray detector 16 is 10 to 300 ($\mu$m) and preferably 50 to 200 ($\mu$m).

As the X-ray detector 16, a flat panel detector (FPD) can be used. Any of the following types of FPD can be used, an indirect conversion type which converts the detected X-ray to an electric signal through a photoelectric conversion element or a direct conversion type which directly converts the detected X-ray to the electric signal.

According to the indirect conversion type, photoelectric conversion elements are positioned with a thin film transistor (TFT) two-dimensionally below a scintillator plate such as CsI or $Gd_2O_2S$ to constitute pixels. When the X-ray entering the X-ray detector 16 is absorbed in the scintillator plate, the scintillator plate emits light. With such emitted light, the charge is accumulated in each photoelectric conversion element and the accumulated charge is read as the image signal.

According to the direct conversion type, by thermal evaporation deposition of amorphous selenium, the amorphous selenium film with the film thickness of 100 to 1000 ($\mu$m) is formed on the glass and the amorphous selenium film and the electrode are deposited on the array of the TFT positioned two-dimensionally. When the amorphous selenium film absorbs the X-ray, the voltage is free in the material in the form of an electron-hole pair, and the voltage signal among electrodes is read by the TFT.

Imaging units such as a charge coupled device (CCD) or an X-ray camera can be used as the X-ray detector 16.

According to the present embodiment, the X-ray Talbot imaging apparatus 1 images a plurality of moire images Mo using the fringe scanning method. That is, in the X-ray Talbot imaging apparatus 1 according to the present embodiment, the relative position of the first grating 14 and the second grating 15 is shifted in the x-axis direction in FIG. 1 to FIG. 3 (that is, the direction orthogonal to the extending direction (y-axis direction) of the slit S) to image a plurality of moire images Mo.

Then, in the image process by the image processing apparatus 2 (see FIG. 4) which received the image signal for a plurality of moire images Mo from the X-ray Talbot imaging apparatus 1, the absorption image, the differential phase image, and the small-angle scattering image are reconstructed (that is, image reconstructing) based on the plurality of moire images Mo.

The X-ray Talbot imaging apparatus 1 according to the present embodiment is able to move the first grating 14 in the x-axis direction in a unit of a predetermined amount in order to image a plurality of moire images Mo by the fringe scanning method. Instead of moving the first grating 14, the second grating 15 can be moved or both the first grating 14 and the second grating 15 can be moved.

Alternatively, the X-ray Talbot imaging apparatus 1 may image only one moire image Mo with the relative position of the first grating 14 and the second grating 15 fixed. The image processing in the image processing apparatus 2 may reconstruct the absorption image and the differential phase image using a Fourier conversion method on the moire image Mo.

The configuration of the other portions of the X-ray Talbot imaging apparatus 1 according to the present embodiment is described. The present embodiment is a vertical type, and the following components are positioned in the following order in the z-direction which is the gravity direction, the X-ray generating apparatus 11, the radiation source grating 12, the object stage 13, the first grating 14, the second grating 15, and the X-ray detector 16. That is, according to the present embodiment, the z-direction is the irradiating direction of the X-ray from the X-ray generating apparatus 11.

As the X-ray source 11a, the X-ray generating apparatus 11 includes a Coolidge X-ray source or a rotating anode X-ray source which are widely used in the medical field. The X-ray source other than the above may also be used. The X-ray generating apparatus 11 according to the present embodiment irradiates the X-ray as a cone beam shape from the focal point. That is, as shown in FIG. 1, the X-ray is irradiated with an X-ray irradiating axis Ca matching with the z-direction as the central axis so that the X-ray spreads as the position becomes farther from the X-ray generating apparatus 11 (that is, X-ray irradiating range).

According to the present embodiment, the radiation source grating 12 is provided below the X-ray generating apparatus 11. According to the present embodiment, the radiation source grating 12 is attached to a fixing member 12a attached to the base unit 18 provided in the supporting pole 17 instead of the X-ray generating apparatus 11 so that the vibration of the X-ray generating apparatus 11 caused by rotation of the anode of the X-ray source 11a is not transmitted to the radiation source grating 12.

According to the present embodiment, a buffer member 17a is provided between the X-ray generating apparatus 11 and the supporting pole 17 so that the vibration of the X-ray generating apparatus 11 is not transmitted to the other portions of the X-ray Talbot imaging apparatus 1 such as the supporting pole 17 (or in order to make the transmitted vibration small).

According to the present embodiment, in addition to the radiation source grating 12, the following components can be attached to the fixing member 12a, a filter (additional filter) 112 which changes the radiation quality of the X-ray that passes the radiation source grating 12, an irradiating field diaphragm 113 which focuses the irradiating field of the irradiated X-ray, and an irradiating field lamp 114 to emit visible light to the object instead of the X-ray before irradiating the X-ray to match the position.

The radiation source grating 12, the filter 112, and the irradiating field diaphragm 113 do not need to be provided in this order. According to the present embodiment, a first cover unit 120 is provided around the radiation source grating 12, etc. to protect the above components.

According to the present embodiment, the controller 19 (see FIG. 1) includes a computer in which a CPU (Central Processing Unit), a ROM (Read Only Memory), a RAM (Random Access Memory), and an input/output interface (all not shown) are connected to each other through a bus. The controller 19 can be a dedicated controlling apparatus instead of a general computer used in the present embodiment. Although not illustrated, the controller 19 is suitably provided with various units or devices such as an input unit including an operating unit, an output unit, a storage unit, and a communicating unit.

The output unit includes a display (not illustrated) which displays information necessary to perform various operations in the X-ray Talbot imaging apparatus 1 and the generated reconstructing image.

The controller 19 performs overall control of the X-ray Talbot imaging apparatus 1. That is, for example, the controller 19 is connected to the X-ray generating apparatus 11, and the tubular voltage, the tubular current and the irradiating time can be set for the X-ray source 11a. For example, the controller 19 is able to relay transmitting and receiving of signals and data between the X-ray detector 16 and the external image processing apparatus 2.

That is, the controller 19 according to the present embodiment functions as the controlling unit which performs the string of imaging to obtain the plurality of moire images Mo (in the Fourier conversion method, one moire image) necessary to generate the reconstructed image of the object H.

[Controlling Apparatus]

According to the present embodiment, a general purpose computer apparatus (control PC) is employed as the controlling apparatus 20 which executes various processes such as estimating the evaluation index. The apparatus is not limited to the above, and some of the functions of the controlling apparatus 20 can be provided on a network and the processes can be executed by exchanging data through communication.

Figure 4:
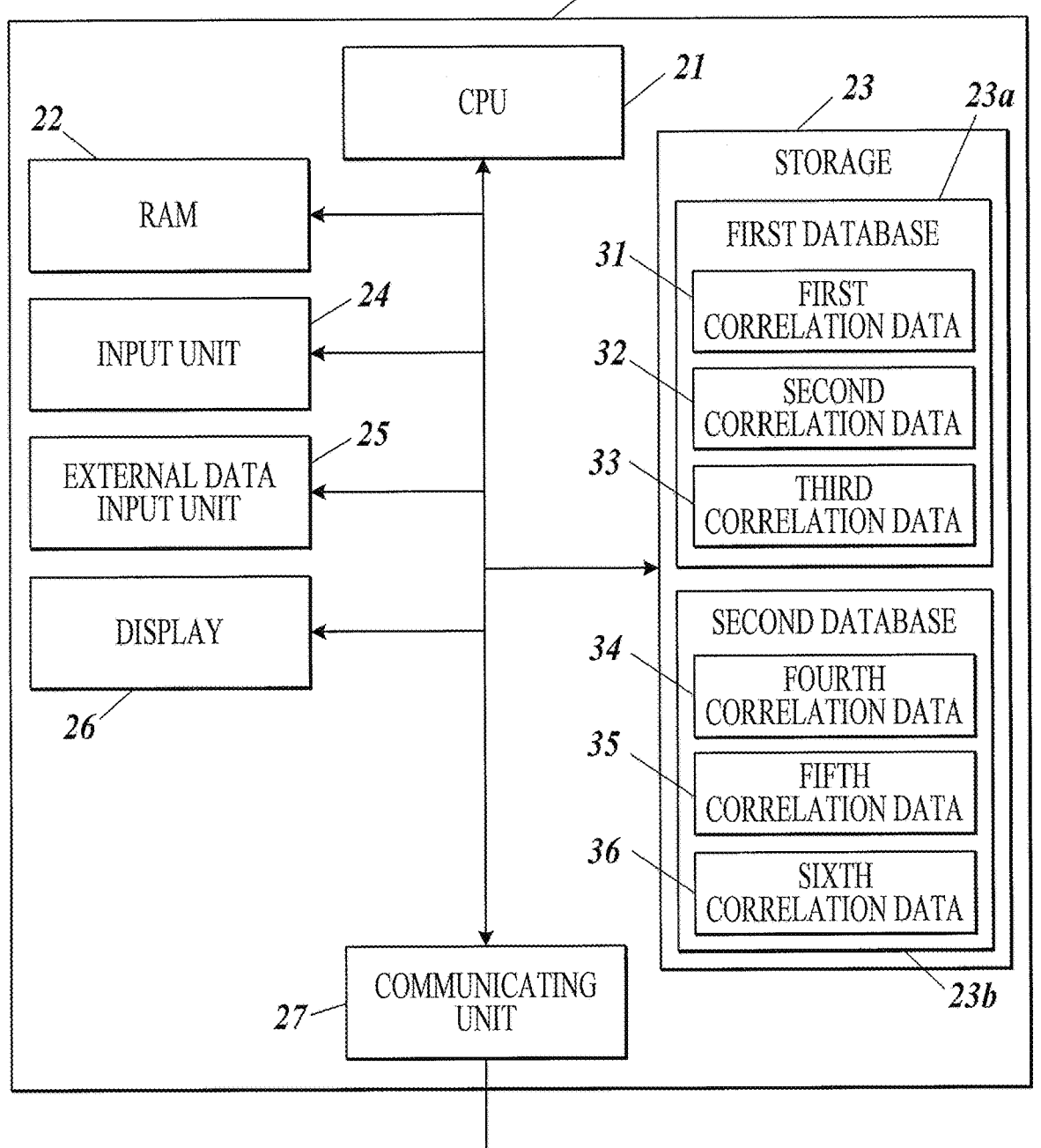
FIG. 4 is a block diagram showing a schematic configuration of an X-ray imaging system.

As shown in FIG. 4, the controlling apparatus 20 includes a CPU 21 (Central Processing Unit), a RAM 22 (Random Access Memory), a storage 23, an input unit 24, an external data input unit 25, a display 26, and a communicating unit 27.

The CPU 21 reads various programs such as the system program and the process program stored in the storage 23 and deploys the program in the RAM 22. According to the deployed program, the CPU 21 executes various processes such as the later described estimating of the evaluation index. That is, the CPU 21 functions as the controlling unit of the entire X-ray imaging system.

The RAM 22 functions as a work area to temporarily store various programs which are read from the storage 23 to be executed in the CPU 21, input or output data, and parameters when the CPU 21 executes the various processes.

The storage 23 includes a nonvolatile memory such as a hard disk drive (HDD) or a semiconductor memory. In addition to various programs as described above, the storage 23 stores a first data base 23a and a second database 23b necessary to perform various processes such as estimating the evaluation index as described later.

The first database 23a is a database regarding a reconstructed image of the object H obtained by the X-ray Talbot imaging apparatus 1.

The second database 23b is a database regarding the material (composite material) as the examined target which is the object H.

The first database 23a and the second database 23b do not have to be stored in the storage 23 of the controlling apparatus 20 and may be provided on the network.

Specifically, the first database 23a shows the relation between the signal strength in the reconstructed image of the examined target and the quality information of the material included in the examined target. The signal strength is different for each material.

The signal strength in the reconstructed image of the examined target shows the degree of the signal value in each pixel of the reconstructed image (small-angle scattering image or differential phase image).

The quality information of the material included in the examined target shows various information regarding the quality of the material (that is, the composite material), for example, density of the crack occurring in the material (crack density), orientation of fibers included in the material (fiber orientation degree), density of the fiber included in the material (fiber density), density of the material (material density), density of the void in the material (void density), density of peeling occurring in the material (peeling density), amount of chemical change occurring in the material, coating density of coating covering the material, and the like.

The type of quality information in which the signal strength in the reconstructed image changes in proportion with the thickness information (thickness dimension) of the material included in the examined target includes crack density, material density, void density, peeling density, chemical change amount, and coating density.

Figure 6:
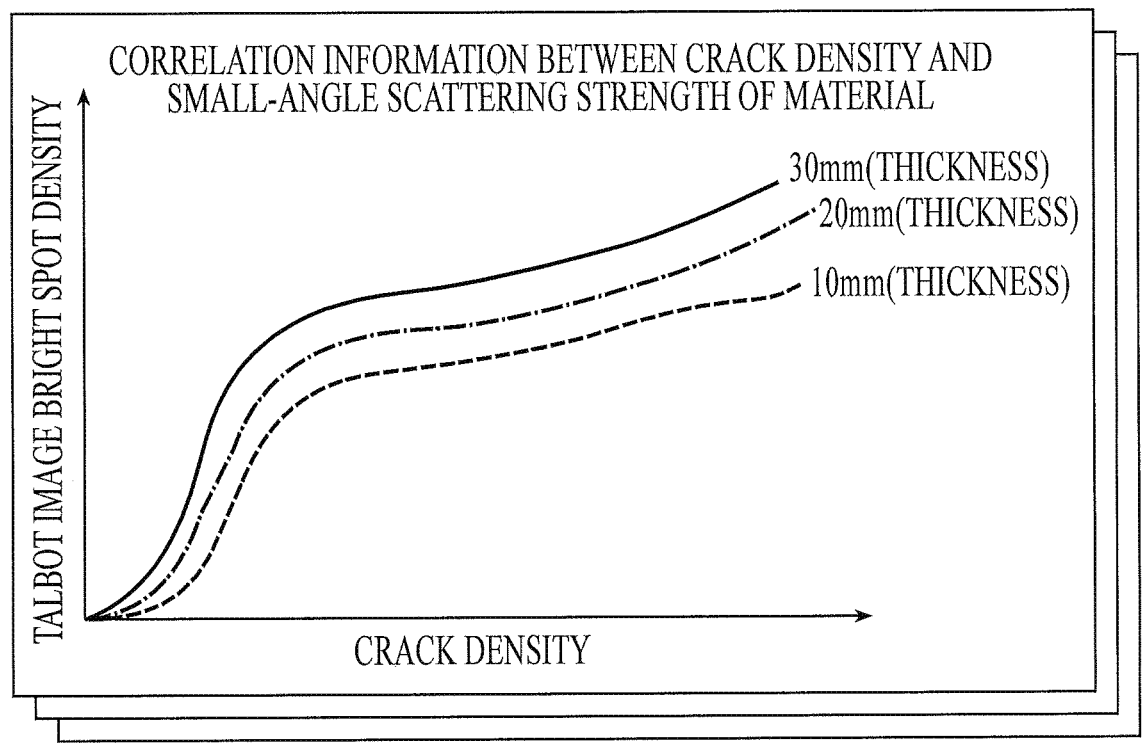
FIG. 6 is a diagram to describe a method to estimate a crack density of a composite material.

The first database 23a includes the correlation data showing the correlation with the signal strength in the reconstructed image of the examined target for each set of the quality information or for each material composing the examined target. An example of such correlation data is shown in FIG. 6, showing the signal strength in the reconstructed image of the examined target and the correlation in the quality information of the material such as crack density. That is, the larger the signal density (the integral value of the signal strength for each unit of square area) in the reconstructed image (Talbot image) of the examined target is, the higher the crack density becomes. Among the items in the quality information other than the crack density, the correlation data for the above-described quality information other than the fiber orientation degree and the fiber density depends on the magnitude of the signal strength, similar to the example of the crack density.

As shown in FIG. 6, the correlation between the signal strength in the reconstructed image of the examined target and the quality information of the material such as crack density differs depending on not only the type of material included in the examined target but also depending on the thickness of the examined material. Therefore, when the evaluation index is estimated, the thickness information of the material included in the examined target is necessary. Such data regarding the correlation between the signal strength and the quality information in which the correlation corresponding to the thickness information is shown is stored and accumulated in the storage 23. When the quality determination is performed for other examined targets including the same type of material, the accumulated data is used.

As a specific example of the database stored in the first database 23a, the data showing the correlation between the signal strength in the reconstructed image of the examined target and the crack density of the material included in the examined target is called first correlation data 31. Although not shown, there is correlation data between the items of the quality information other than crack density, fiber orientation degree, and fiber density (material density, void density, etc.) and signal strength in the reconstructed image of the examined target, and hereinafter, such data is called other correlation data in the first database 23a.

The data showing the correlation between the change in the signal strength according to the angle in the grating array direction with relation to the examined target when the reconstructed image of the examined target is imaged and the fiber orientation degree of the material included in the examined target is called second correlation data 32.

The data showing the correlation between the signal strength in the reconstructed image of the examined target and the fiber density of the material included in the examination target is called third correlation data 33.

When the quality information includes the fiber orientation degree and/or the fiber density, the examined target includes the fiber which enhances the strength of the examined target. When the X-ray Talbot imaging apparatus 1 obtains the moire image of the examined target, the X-ray Talbot imaging apparatus 1 rotates the examined target around the axis of the X-ray irradiating axis Ca for imaging and stores the signal strength with relation to the rotating angle.

The plurality of gratings 12, 14, and 15 are one-dimensional gratings or the shape of the gratings 12, 14, and 15 need to have anisotropy. Therefore, in the first database 23a, the information regarding the signal strength in the reconstructed image includes information regarding the angle dependence of the change in the signal strength in the reconstructed image.

The second database 23b shows the correlation between the quality information of the material (that is, composite material) included in the examined target and the information regarding the mechanical strength corresponding to the quality information. The mechanical strength shows the strength of the material when a load such as tensile force is applied to the material.

The quality information of the material shows the above-described various pieces of information such as crack density.

Various conditions occurring in the material such as crack and void or the fiber orientation and the fiber density in the material may influence the material included in the examined target. That is, various conditions such as crack and the fiber orientation and the fiber density have a correlation with the mechanical strength of the material, and the information regarding the mechanical strength corresponding to the quality information in the second database 23b shows the degree of the mechanical strength of the material depending on the degree of various conditions such as crack, etc., or the fiber orientation degree or the fiber density.

Below, as the specific example of the database stored in the second database 23b, data showing the correlation between the crack density of the material included in the examined target and the mechanical strength of the material included in the examined target is called fourth correlation data 34. Although not shown, there is correlation data between the items of the quality information other than crack density, fiber orientation degree, and fiber density (material density, void density, etc.) and mechanical strength of the material included in the examined target, and hereinafter, such data is called other correlation data in the second database 23b.

The data showing correlation between the fiber orientation degree of the material included in the examined target and the mechanical strength of the material included in the examined target is called fifth correlation data 35.

The data showing correlation between the fiber density of the material included in the examined target and the mechanical strength of the material included in the examined target is called sixth correlation data 36.

The input unit 24 includes a keyboard including a cursor key, a numeral input key, and various function keys, and a pointing device such as a mouse. The input unit 24 outputs a pressed signal showing the key pressed on the keyboard or an operation signal by the mouse, and outputs the signal as an input signal to the CPU 21. The CPU 21 is able to perform various processes based on the operation signal from the input unit 24.

The name or shape information of the material (composite material) included in the examined target and the experiment data showing the results of various tests performed on the examined target can be input on the input unit 24. The input information is stored in the storage 23, and the input information is used when the CPU 21 estimates the evaluation index in the area of interest of the examined target and estimates the mechanical strength in the area of interest of the examined target. That is, the input unit 24 functions as the input unit in the X-ray imaging system.

The external data input unit 25 is for inputting data obtained from the external apparatus in the X-ray imaging system. The name and shape information of the material (composite material) included in the examined target, and the test data showing the result of various tests performed on the examined target can be input from the external apparatus through the external data input unit 25.

For example, as the external data input unit 25, various devices can be employed, for example, a USB (Universal Serial Bus) port or Bluetooth (registered trademark) which can transmit and receive data wired or wirelessly between external devices, and a drive which can read data from a recording medium corresponding to the external apparatus. That is, any device through which data can be input from outside the X-ray imaging system to the X-ray imaging system can be employed, and such external data input unit 25 functions as an input unit in the X-ray imaging system. Specifically, with the exception of the thickness of the plate shaped member, the data input through the external data input unit 25 is mostly data which is difficult to input manually, and for example, CAD data can be employed as the shape information of the material.

The display 26 includes a monitor such as a cathode ray tube (CRT) or a liquid crystal display (LCD). The display 26 displays various screens according to an instruction of the display signal input from the CPU 21. When the touch panel is employed as the display 26, the display 26 also includes the function as the input unit 24.

Similar to the display of the controller 19, the display 26 is able to display the generated reconstructed image, and is also able to display the result of the determination of the quality of the examined target, and the spot that is unsatisfactory when the result of the quality determination is failed.

The communicating unit 27 includes a communication interface and communicates with external devices on the network. The communicating unit 27 may be commonly used as the external data input unit 25.

The external apparatus on the network includes the controller 19 of the X-ray Talbot imaging apparatus 1, and the controller 19 is connected to be able to communicate with the controlling apparatus 20 through the communicating unit 27.

The controlling apparatus 20 (CPU 21) performs various processes to perform the quality determination of the examined target using various databases 31, 32, 33, 34, 35, and 36, and the processes are performed based on the program stored in the storage 23.

The programs stored in the storage 23 include, an evaluation index estimate program, an image generating program, an emphasis display program, a material strength estimate program, a pass/fail determination program, a failed area display program, a signal strength discrimination program, an examined target range specifying program and the like.

The evaluation index estimate program is a program to estimate the evaluation index in the area of interest in the examined target based on the input name and the input shape information of the material and the first database 23*a* (first correlation data 31, second correlation data 32, third correlation data 33). The CPU 21 performs the evaluation index estimate program and is able to estimate the evaluation index (quality information such as the crack density, fiber orientation degree, etc.) used when the quality determination is performed for the examined target.

The area of interest shows the area which should be specifically examined in the examined target, and this can be selected freely by the user such as the radiological technician, testing technician, etc., or this can be selected by performing a later described examined target range specifying program.

The range of the area of interest in which the test is performed is determined by the range which can be imaged by the X-ray Talbot imaging apparatus 1 (showing the above-described X-ray irradiating range).

Specifically, the type of material included in the examined target is specified from the input name of the material, and the thickness information (or 3D data) of the material included in the examined target is specified from the input shape information of the material.

When the quality determination of the material of the examined target is performed with the above-described crack density, the first correlation data 31 in the first database 23*a* or the other correlation data in the first database 23*a* is used (here, the first correlation data 31 is used in the description).

Figure 5B:
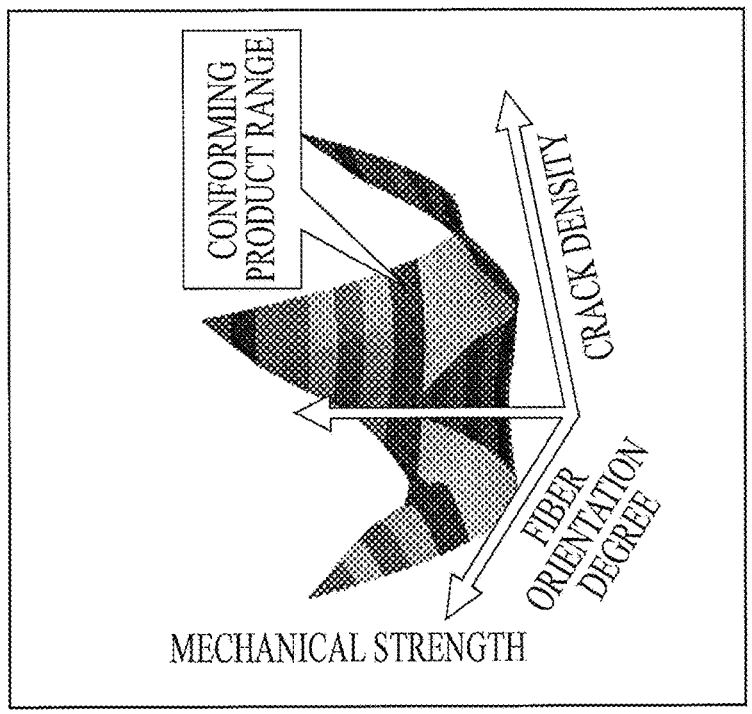
FIG. 5B is a schematic diagram to describe a method to make a determination regarding quality of an examined target.
Figure 5A:
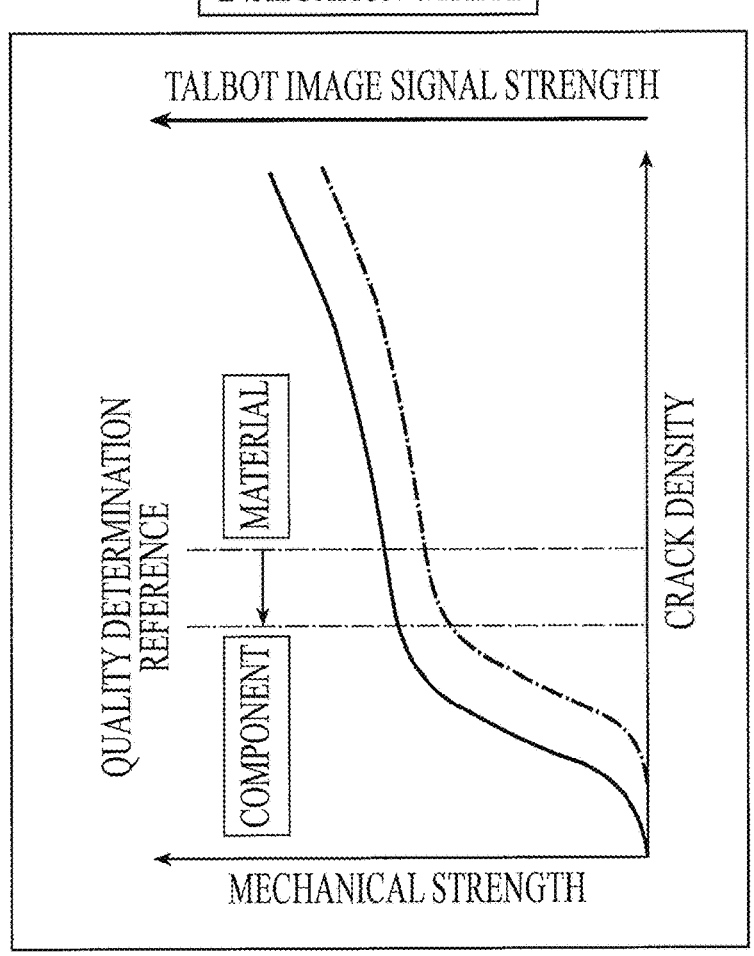
FIG. 5A is a schematic diagram to describe a method to make a determination regarding quality of an examined target.

The examined target as the object H is actually imaged with the X-ray Talbot imaging apparatus 1 to obtain the reconstructed image (small-angle scattering image or diffusion phase image, here small-angle scattering image). The reconstructed image is used to determine the crack density of the examined target. That is, as shown in FIG. 5A, FIG. 5B, and FIG. 6, the signal density of the Talbot image (small-angle scattering image) is determined by the imaging, and the crack density can be derived from the above.

As shown in FIG. 6, the signal density is different depending on the thickness of the material, and therefore, the crack density can be derived according to the thickness information of the specified material. That is, the signal strength in the reconstructed image changes with proportion to the thickness information of the material. That is, the correlation between the signal strength in the reconstructed image of the examined target and the quality information of the material such as crack density differs depending on the thickness information of the material.

When the crack density according to the thickness information is determined in the area of interest in the material included in the examined target, the data can be used as the evaluation index of the examined target estimated from the reconstructed image obtained by imaging with the X-ray Talbot imaging apparatus 1. That is, this can be used as the evaluation index to perform the quality determination of the material included in the examined target.

The data regarding the correlation between the signal strength and the quality information corresponding to the thickness information is stored and accumulated in the storage 23, and the accumulated data can be used in the quality determination of the examined target. However, the quality determination may be performed for a new examined target and the thickness information for such examined target may not be included in the accumulated data. In this case, that is, when input of the new thickness information is received, the CPU 21 uses the thickness information of the material stored in the first database 23*a* to estimate the evaluation index corresponding to the new thickness information.

As shown in FIG. 6, to be specific, the accumulated data in which the thickness information is 10 mm, 20 mm, and 30 mm is stored in the storage 23, and when the quality determination of the new examined target is performed, an intermediate value among the plurality of stored data is employed. That is, when the thickness information of the material included in the new examined target is 15 mm, the value between the accumulated data in which the thickness information is 10 mm and the accumulated data in which the thickness information is 20 mm is used in the estimate of the evaluation index. With this, even when the input of new thickness information is received, the evaluation index can be estimated from the obtained reconstructed image.

When the material of the examined target includes fiber and the quality determination is performed with the quality information such as the fiber orientation degree and/or the fiber density, the second correlation data 32 and/or the third correlation data 33 in the first database 23a is used (the second correlation data 32 is used in the description below).

That is, the CPU 21 performs the evaluation index estimate program and is able to estimate the evaluation index (fiber orientation degree and fiber density) used when the quality determination of the examined target is performed based on the input name and the input shape information of the material and the second correlation data 32 (and/or the third correlation data 33) in the first database 23a.

The examined target as the object H is actually imaged by the X-ray Talbot imaging apparatus 1 to obtain the reconstructed image (small-angle scattering image or diffusion phase image, here small-angle scattering image) and the reconstructed image is used to determine the fiber orientation degree of the examined target. The fiber density is determined by estimate using the third correlation data 33, and both the fiber orientation degree and the fiber density are determined as the evaluation index when both the second correlation data 32 and the third correlation data 33 are used.

The fiber orientation degree is determined by the gratings 12, 14, 15 in the X-ray Talbot imaging apparatus 1 as the one-dimensional grating. That is, the gratings 12, 14, 15 have anisotropy, and the orientation of the fiber included in the material can be determined.

Described in detail, when the moire image of the examined target is obtained, the X-ray Talbot imaging apparatus 1 images the examined target rotated around the axis of the X-ray irradiating axis Ca, and the signal strength with relation to the rotating angle is stored. Therefore, in the second correlation data 32 and the third correlation data 33 in the first database, the information regarding the angle dependency of the change in the signal strength in the reconstructed image is included in the information regarding the signal strength in the reconstructed image. That is, information showing how much the change in the signal strength depends on the imaging angle (rotating angle around the axis) when the examined target is rotated around the axis of the X-ray irradiating axis Ca is included.

Figure 7:
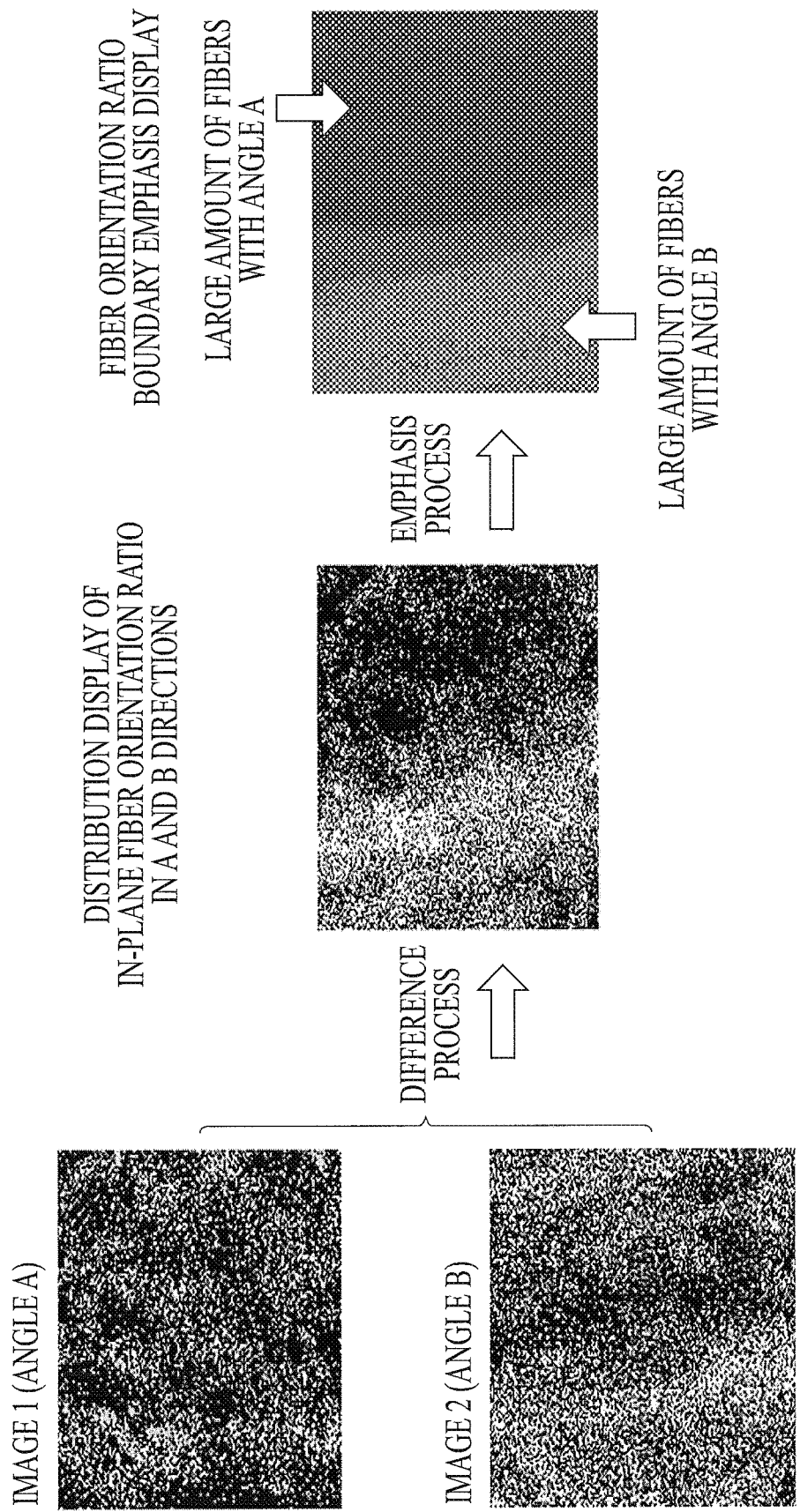
FIG. 7 is a diagram to describe an in-plane distribution display and an emphasized display of a fiber orientation ratio.

The orientation of the fiber is not constant. Therefore, the orientation of the fiber is varied and the fiber is oriented in various angles in the area of interest in the examined target. Therefore, when the quality determination is performed with the quality information such as the fiber orientation degree and/or the fiber density, the imaging by the X-ray Talbot imaging apparatus 1 is performed with a plurality of angles, and the reconstructed image can be obtained for each angle. Then, as shown in FIG. 7, the CPU 21 combines the reconstructed images obtained by imaging in a plurality of angles with arithmetic processes. With this, the in-plane distribution of the ratio of the plurality of fiber orientation degrees being the target of interest can be extracted.

Image 1 and image 2 shown on the left side in FIG. 7 are reconstructed images (small-angle scattering image) obtained by imaging the examined target from a plurality of different angles. The CPU 21 obtains the difference between the image 1 and the image 2, and is able to generate the image (in-plane distribution of fiber orientation ratio in A and B directions) shown in the middle of FIG. 7. That is, it is possible to show in the image that the fibers included in the examined target are oriented in a plurality of different angles.

The storage 23 stores the image generating program which calculates (difference process) as the data the reconstructed image obtained by imaging from a plurality of angles and generates the in-plane distribution display image. The image generating program is linked with the evaluation index estimate program and is performed by the CPU 21 when the quality determination is performed with the quality information such as the fiber orientation degree and/or the fiber density.

As shown in the image on the right side of FIG. 7, the CPU 21 displays a simplified distribution of the signal strength in the reconstructed image according to allocation reference of the signal set in advance. With this, it is possible to enhance the boundary where the ratio of the fiber orientation degrees changes in the plane and the boundary can be extracted. That is, the image showing the in-plane distribution of the fiber orientation ratio shown in the center of FIG. 7 can be displayed with emphasis for each angle rotated and imaged. More specifically, in the image shown in the right side of FIG. 7, the area where the amount of fibers with angle A is large, and the area where the amount of fibers with angle B is large are displayed with emphasis using different colors. Alternatively, the boundary of both areas are displayed emphasized with another color or no color.

The allocation reference of the signal is set by the user in advance, and for example, a value of the signal strength is to be the reference.

The storage 23 stores the emphasis display program which displays the simplified distribution of the signal strength in the reconstructed image according to the signal allocation reference to emphasize and extract the boundary in the plane of the ratio of the fiber orientation degrees. The emphasis display program is linked with the image generating program and is performed by the CPU 21 when the quality determination is performed with the quality information such as the fiber orientation degree and/or fiber density.

In addition to the fiber orientation degree, the in-plane distribution in the fiber density can be similarly extracted with the image generating program by arithmetic processes and combining process of the reconstructed image obtained by imaging with a plurality of angles. Further, the boundary of the fiber density in the plane can be emphasized and extracted with the emphasis display program by simplifying and displaying the distribution of the signal strength in the reconstructed image according to the signal allocation reference set in advance.

The orientation of the fiber can be determined with the gratings 12, 14, 15 in the X-ray Talbot imaging apparatus 1 as the one-dimensional grating. Alternatively, when the two-dimensional grating is used, the orientation of the fiber can be estimated by combining other conventional methods such as performing Fourier conversion on the imaged image. However, when such method is used, the resolution decreases compared to the method using fringe scanning.

The quality information such as the crack density, the fiber orientation degree, and the fiber density estimated as the evaluation index by the evaluation index estimate program is used as the determination reference when the quality determination is performed for the material included in the examined target. That is, for example, when the crack density in the area of interest of the examined target can be estimated, the amount of cracks in the area of interest of the examined target can be determined, and it is possible to perform the quality determination of the examined target. If the quality information such as the crack density, the fiber orientation degree, and the fiber density in the area of interest in the examined target can be estimated, it is possible to perform the quality determination by determining whether the above satisfy the reference value determined by the examiner.

When the quality determination of the examined target is performed, the reference value of the quality information such as the crack density and the fiber orientation degree to be used in the quality determination can be set freely according to the purpose of use of the examiner. That is, the CPU 21 can perform the quality determination based on the reference value of the quality information obtained by performing the evaluation index estimate program and the storage 23 stores the program and data to perform the above.

Next, the material strength estimate program performs the program to estimate the mechanical strength in the area of interest of the examined target based on the input name and the input shape information of the material and the second database 23b (fourth correlation data 34, fifth correlation data 35, and sixth correlation data 36). The CPU 21 performs the material strength estimate program and is able to estimate the mechanical strength of the material as the evaluation index used when the quality determination of the examined target is performed.

More specifically, the type of material included in the examined target is specified from the input name of the material, and the thickness information (or 3D data) of the material included in the examined target is specified from the input shape information of the material.

When the material of the examined target does not include fiber or the material includes the fiber but the quality determination is performed with the quality information other than the fiber orientation degree or the fiber density (above-described crack density), the fourth correlation data 34 of the second database 23b or the other correlation data in the second database 23b is used (here, the fourth correlation data 34 is described).

The second database 23b (here, fourth correlation data 34) shows a correlation between quality information of the material included in the examined target (here, crack density) and the information regarding the mechanical strength corresponding to the quality information. The evaluation index estimate program is performed to derive the crack density, and the mechanical strength corresponding to this crack density is determined. That is, the mechanical strength of the material included in the examined target actually imaged by the X-ray Talbot imaging apparatus 1 can be obtained. Then, the X-ray Talbot imaging apparatus 1 actually images the examined target as the object H to obtain the reconstructed image (small-angle scattering image or diffusion phase image, here small-angle scattering image) and the mechanical strength of the examined target is determined from the reconstructed image.

When the material of the examined target includes fiber, and the quality determination is performed with the quality information such as the fiber orientation degree and/or the fiber density, the fifth correlation data 35 and/or the sixth correlation data 36 in the second database 23b is used (here, the fifth correlation data 35 is described).

That is, the CPU 21 performs the material strength estimate program based on the input name and input shape information of the material and the fifth correlation data (and/or sixth correlation data 36) in the second database 23b and the evaluation index (mechanical strength corresponding to fiber orientation degree and fiber density) used when the quality determination of the examined target is performed can be estimated. When the estimate is performed using the sixth correlation data 36, the mechanical strength corresponding to the fiber density can be determined, and when both the fifth correlation data 35 and the sixth correlation data 36 are used in the estimate, the mechanical strength corresponding to the combination of both the fiber orientation degree and the fiber density is determined as the evaluation index.

If the mechanical strength can be obtained as described above, it is possible to determine whether the mechanical strength is high or low. The performance of the examined target is directly determined compared to when the quality determination of the examined target is performed with only the quality information as the evaluation index. Therefore, the user without knowledge regarding the material is able to perform quality determination.

Next, the pass/fail determination program automatically determines whether the material included in the examined target passed or failed in view of the mechanical strength based on the determination reference of the mechanical strength set in advance by the user.

The pass/fail determination program is stored in the storage 23 and after the mechanical strength of the material is estimated by the mechanical strength estimate program, the CPU 21 performs the pass/fail determination program. As a result of the pass/fail, when the result is passed, the degree of the mechanical strength is displayed quantitatively on the display 26.

When the result is failed, the degree of the mechanical strength is displayed quantitatively on the display 26, and the failed area display program displays the failed area on the reconstructed image displayed on the display 26 (later described).

The determination reference of the mechanical strength can be suitably changed according to the type of examined target and the part of the examined target. For example, even if the material which is used is the same, when the type of examined target is different such as a turbine of an airplane engine and a roof of a building, the determination reference of the mechanical strength may be different. Even if the type of examined target is the same turbine of an airplane engine, the load may be different depending on the part, and the determination reference of the mechanical strength may be different depending on the part. Therefore, preferably, the determination reference of the mechanical strength is changed suitably depending on the type of the examined target and the part of the examined target.

Further, when the quality determination of the examined target is performed, the reference of determining quality may be different depending on whether the determination is made as a composing part (component) of various products or as material. As shown in FIG. 5A, the determination reference is set differently between the "component" and the "material".

When the quality determination of the examined target is performed with various types of quality information combined, as shown in FIG. 5B, the determination reference may be understood multi-dimensionally.

Next, the failed area display program displays the failed area in the material on the reconstructed image based on the determination result of the pass/fail determination of the mechanical strength.

Such failed area display program is stored in the storage 23 and the program is performed by the CPU 21 when the pass/fail determination is made for the mechanical strength with the pass/fail determination program and it is determined that the result is failed. Then, the failed area is displayed on the reconstructed image displayed on the display 26.

When the failed area is displayed on the reconstructed image displayed on the display 26, the following methods are used to easily discriminate the failed areas, for example, by making the color of the failed area on the reconstructed image a color different from the other areas, emphasizing the outline of the failed area, pointing the failed area with an arrow, or circling the failed area.

In addition to the reconstructed image displayed on the display 26 of the controlling apparatus 20, the failed area can be displayed on the reconstructed image displayed on the display of the controller 19 in the X-ray Talbot imaging apparatus 1, and on the reconstructed image displayed on the display in the external apparatus connected to be communicable with the controlling apparatus 20.

The failed area can also be displayed overlapped on the in-plane distribution image of the fiber orientation degree or the fiber density generated from the reconstructed image by performing the image generating program, and on the image displayed with emphasis by the emphasis display program.

Next, the signal strength discrimination program discriminates the signal strength due to the quality information of the examined target and the signal strength due to the shape of the examined target based on the reconstructed image and the input shape information of the material.

Such signal strength discrimination program is stored in the storage 23, and the CPU 21 performs the signal strength discrimination program when the quality information of the material included in the examined target is estimated as the evaluation index by the evaluation index estimate program.

Specifically, the signal value of the differential phase image and the small-angle scattering image becomes large depending on the angle of the plane of the examined target with relation to the imaging direction. When a one-dimensional grating or a two-dimensional grating is used, the edge plane shape in the direction orthogonal to the grating array direction has a large signal value. In view of the above, before the examined target is imaged, when there is shape information (for example, CAD data) of the material included in the examined target, it is possible to roughly predict the state of the imaged image in a normal state. Therefore, after imaging, by comparing the generated reconstructed image with the normal signal assumed from the shape information of the material, the influence of the signal from the desired shape in the original design can be removed from the determination. When an existing imaged sample of a passed product can be used, the part where the signal is emitted in the imaging data of the passed product can be eliminated.

Next, the examined target range specifying program specifies in advance the examined target range (that is, the area of interest) for the examined target itself as a component of various merchandise or material included in the examined target.

Such examined target range specifying program is stored in the storage 23 and the program is performed by the CPU 21 before imaging the examined target. The information regarding the specified examined target range is transmitted to the X-ray Talbot imaging apparatus 1, and the imaging can be performed based on the transmitted information regarding the examined target range.

For example, the examined target range is the area where it is predicted by experience that a defect may occur or the area where shortage of strength may cause a serious problem (for example, the attachment root portion in the turbine of the airplane engine where stress is concentrated in use). With this, areas where defects hardly occur or serious problems due to shortage of strength hardly occur can be omitted from the imaging and the examination.

Figure 8:
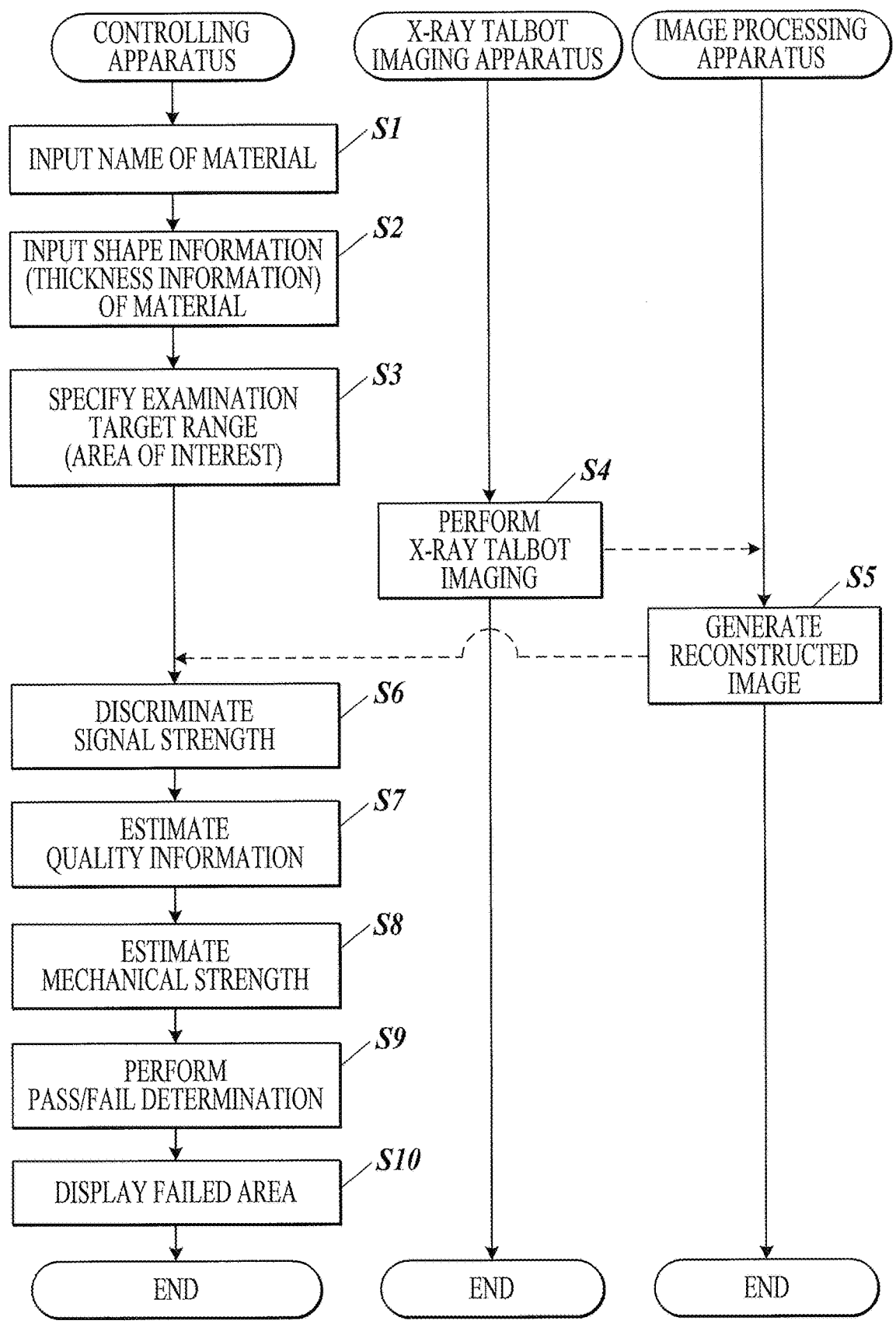
FIG. 8 is a flowchart showing a quality determination process.

Next, with reference to FIG. 8, the flow of the quality determination process by the X-ray imaging system as described above is described.

First, in order to specify the material (composite material) included in the examined target as the object H, the name of the material is input on the input unit 24 or the external data input unit 25 (step S1).

The data is stored and accumulated in the storage 23 according to the type of material, and the type of material included in the examined target can be specified on the basis of the input data.

Next, in order to specify the shape information (thickness information) of the material included in the examined target as the object H, the shape information of the material is input on the input unit 24 or the external data input unit 25 (step S2).

Since the data is stored and accumulated in the storage 23 according to the shape of the material, the shape information of the material included in the examined target can be specified based on the input data.

Next, the examined target range (area of interest) is specified for the examined target itself as the component or the material included in the examined target (step S3).

The examined target range can be specified by the user on the input unit 24 freely or the examined target range specifying program can be performed.

Next, the X-ray Talbot imaging apparatus 1 images the area of interest in the examined target as the object H and obtains the moire image Mo (step S4).

When the material in the examined target includes fiber, and the quality determination is performed using the quality information such as the fiber orientation degree and/or the fiber density provided with a detailed determination reference, the X-ray Talbot imaging apparatus 1 images the examined target rotated around the axis of the X-ray irradiating axis Ca and stores the signal strength of the grating when the subject is imaged with relation to the rotating angle.

Next, the image processing apparatus 2 processes the image signal of the moire image Mo imaged by the X-ray Talbot imaging apparatus 1, and based on the moire image Mo, the reconstructed image such as the absorption image, the diffusion phase image and the small-angle scattering image are generated (step S5).

The following steps can be inserted after step S5, the step to extract the in-plane distribution of the ratio of the plurality of target fiber orientation degrees and/or the in-plane distribution of the fiber density by combining with the arithmetic processing the reconstructed images obtained by imaging in a plurality of angles and the step to emphasize the boundary of the fiber orientation degree ratio and/or the fiber density in the plane by simplifying and displaying the distribution of the signal strength in the reconstructed image according to the allocating reference of the signal set by the user.

Next, based on the generated reconstructed images and the input shape information (CAD data) of the material, the signal strength obtained from the quality information of the examined target or the signal strength obtained when the sample already considered to be passed is imaged is discriminated from the signal strength obtained from the shape of the examined target (step S6).

After the X-ray Talbot imaging apparatus 1 is imaged, the reconstructed image is compared with the normal signal assumed from the shape information of the material to remove the influence of the signal by the desired shape in the original design from the determination.

Then, on the basis of the name and the shape information of the material input in steps S1 and S2 and the first database 23*a* showing the correlation between the information regarding the signal strength in the reconstructed image and the quality information of the material, the quality information in the area of interest in the examined target is estimated as the evaluation index from the reconstructed image generated based on the moire image (step S7).

When the material of the examined target includes the fiber and the quality determination is performed with the quality information such as the fiber orientation degree and/or the fiber density, the second correlation data 32 and/or the third correlation data 33 of the first database 23*a* is used, and the fiber orientation degree and/or the fiber density is estimated as the evaluation index.

Next, the mechanical strength in the area of interest of the examined target is estimated as the evaluation index based on the name and the store information of the material input in steps S1 and S2 and the second database 23*b* showing the correlation between the quality information of the material and the information regarding the mechanical strength corresponding to the quality information (step S8).

When the material of the examined target includes fiber and the quality determination is performed with the quality information such as the fiber orientation degree and/or the fiber density, the fifth correlation data 35 and/or the sixth correlation data 36 of the second database 23*b* is used and the mechanical strength based on the fiber orientation degree and/or the fiber density is estimated as the evaluation index.

Next, the pass/fail determination for the material included in the examined target using the mechanical strength is performed based on the determination reference of the mechanical strength set in advance by the user (step S9).

As a result of the pass/fail determination, when the result is passed, the degree of the mechanical strength is displayed on the display 26. The result of the pass/fail determination can be the result determined for each area of interest and can be the determination result of the entire examined target derived based on the result of the pass/fail determination in a plurality of areas of interest.

Next, based on the determination result of the pass/fail determination of the mechanical strength, the failed area in the material is displayed on the reconstructed image (step S10).

As a result of the pass/fail determination, if the examined target passed, this is considered to be a conforming product. According to the above flow, it is possible to perform the quality determination of the examined target.

As described above, according to the present embodiment, the X-ray Talbot imaging apparatus 1 includes the X-ray source 11*a*, the plurality of gratings 12, 14, and 15, and the X-ray detector 16 aligned in the X-ray irradiating axis Ca direction. The X-ray is irradiated from the X-ray source 11*a* through the examined target of the object H and the plurality of gratings 12, 14, and 15, and to the X-ray detector 16. With this, the moire image Mo which is necessary in order to generate the reconstructed image of the examined target is obtained. The apparatus includes the CPU 21 as the controller and the first database 23*a* (first correlation data 31, second correlation data 32, and third correlation data 33) showing the correlation of the information regarding the signal strength in the reconstructed image generated based on the moire image Mo and the quality information of the material included in the examined target. The CPU 21 estimates as the evaluation index quality information (crack density, fiber orientation degree, fiber density, etc.) in the area of interest in the examined target from the reconstructed image based on the input name and the input shape information of the material and the first database 23*a*. Therefore, it is possible to inspect the entire structure of the examined target in a range with a large square area at once and within a short amount of time by using a small amount of two dimensional images which are reconstructed. It is also possible to inspect large examined targets without using a rotating mechanism.

That is, the name and the shape information of the material are input to specify the type and the shape information of the material included in the examined target. Based on the first database 23*a* showing the correlation between the information regarding the signal strength in the reconstructed image generated based on the moire image Mo and the quality information of the material included in the examined target, the quality information of the imaged examined target can be derived from the information regarding the signal strength in the reconstructed image. Therefore, for example, without using the three-dimensional image reconstructing units such as computed tomography (CT), it is possible to examine the examined target with a large square area with a small amount of data and within a short amount of time. Further, there is no need to rotate the examined target in many directions (three-dimensionally) as in CT, and the large examined target can be examined.

The apparatus includes the second database 23*b* (fourth correlation data 34, fifth correlation data 35, and sixth correlation data 36) showing the correlation between the quality information of the material (crack density, fiber orientation degree, fiber density, etc.) and information regarding the mechanical strength corresponding to the quality information. The CPU 21 estimates as the evaluation index the mechanical strength in the area of interest of the examined target based on the name and the shape information of the material and the second database 23*b*. Therefore, for example, it is possible to estimate the mechanical strength of the material included in the examined target easily without detailed structure analysis which consumes much time using the three-dimensional image reconstructing unit such as the CT. Further, both the quality information of the material and the mechanical strength can be the evaluation index. With this, it is possible to enhance the accuracy as the evaluation index and those without much knowledge regarding the material can perform the quality determination.

The CPU 21 automatically performs the pass/fail determination for the material with the mechanical strength based on the determination reference of the mechanical strength set by the user. Therefore, it is possible to reduce the burden of the user and it is possible to perform accurate determination based on the determination reference.

The CPU 21 displays the failed area in the material based on the determination result of the pass/fail determination of the mechanical strength on the reconstructed image. Therefore, it is easy to find the position of the area which failed and it is possible to enhance the efficiency of analyzing the reason why such failed area can be seen.

The CPU 21 combines the reconstructed images obtained by imaging in a plurality of angles in the arithmetic process to extract the in-plane distribution of the ratio of the plurality of target fiber orientation degrees and/or the in-plane distribution of the fiber density. Therefore, it is possible to easily understand the state of distribution of the fiber orientation degree and/or the fiber density on the reconstructed image which is a two-dimensional image.

The CPU 21 displays in a simplified state the distribution of the signal strength in the reconstructed image according to the allocation reference of the signal set by the user. With this, the boundary of the fiber orientation ratio and/or the fiber density in the plane can be emphasized and extracted. Therefore, the distribution state of the fiber orientation degree and/or the fiber density on the reconstructed image which is a two-dimensional image becomes easier to understand.

The CPU 21 discriminates the signal strength due to the quality information of the examined target and the signal strength due to the shape of the examined target based on the reconstructed image and the input shape information of the material. Therefore, by comparing the generated reconstructed image with the normal signal assumed from the material shape information, the influence of the signal in the desired shape of the original design can be omitted from determination and the accuracy when the quality determination is performed can be enhanced.

The CPU 21 specifies the examined target range (area of interest) in advance for the examined target itself or the material included in the examined target. Therefore, the imaging and examination can be omitted for areas where defects hardly occur or for areas where serious problems hardly occur due to shortage of strength. Therefore, the process to examine the material included in the examined target can be performed faster, and the data becomes lighter.

[Modification]

The embodiments to which the present invention can be applied are not limited to the above-described embodiment, and the scope of the present invention can be suitably changed without leaving the scope of the invention. The modifications are described below. The modifications described below can be combined if possible.

[Modification 1]

The controlling apparatus 20 according to the present modification includes a machine learning function. The reconstructed image obtained by the X-ray Talbot imaging apparatus 1, the test data obtained by various tests actually performed on the examined target after imaging, the material included in the examined target and the shape information, and the quality determination result are used as teaching data, and a quality determination AI which performed machine learning performs the quality determination of the examined target without using the first database 23*a* and the second database 23*b*.

The storage 23 stores the machine learning program to perform machine learning, and the machine learning program is executed by the CPU 21 when the machine learning is performed.

In order to obtain the teaching data, various tests are performed on the examined target after imaging by the X-ray Talbot imaging apparatus 1, for example, a mechanical strength test in which an external load is actually provided or a mechanical strength test under heat resisting and shock resisting conditions. Such tests may be replaced by strength simulation in which a computer evaluates the mechanical strength virtually from the information showing physical properties. That is, a virtual test environment by a mechanical strength test apparatus or computer (both not shown) is used to perform the mechanical strength test of the examined target or the strength simulation.

With this, the teaching data can be obtained as a result of the mechanical strength test or the strength simulation and the result of the quality determination.

Figure 9:
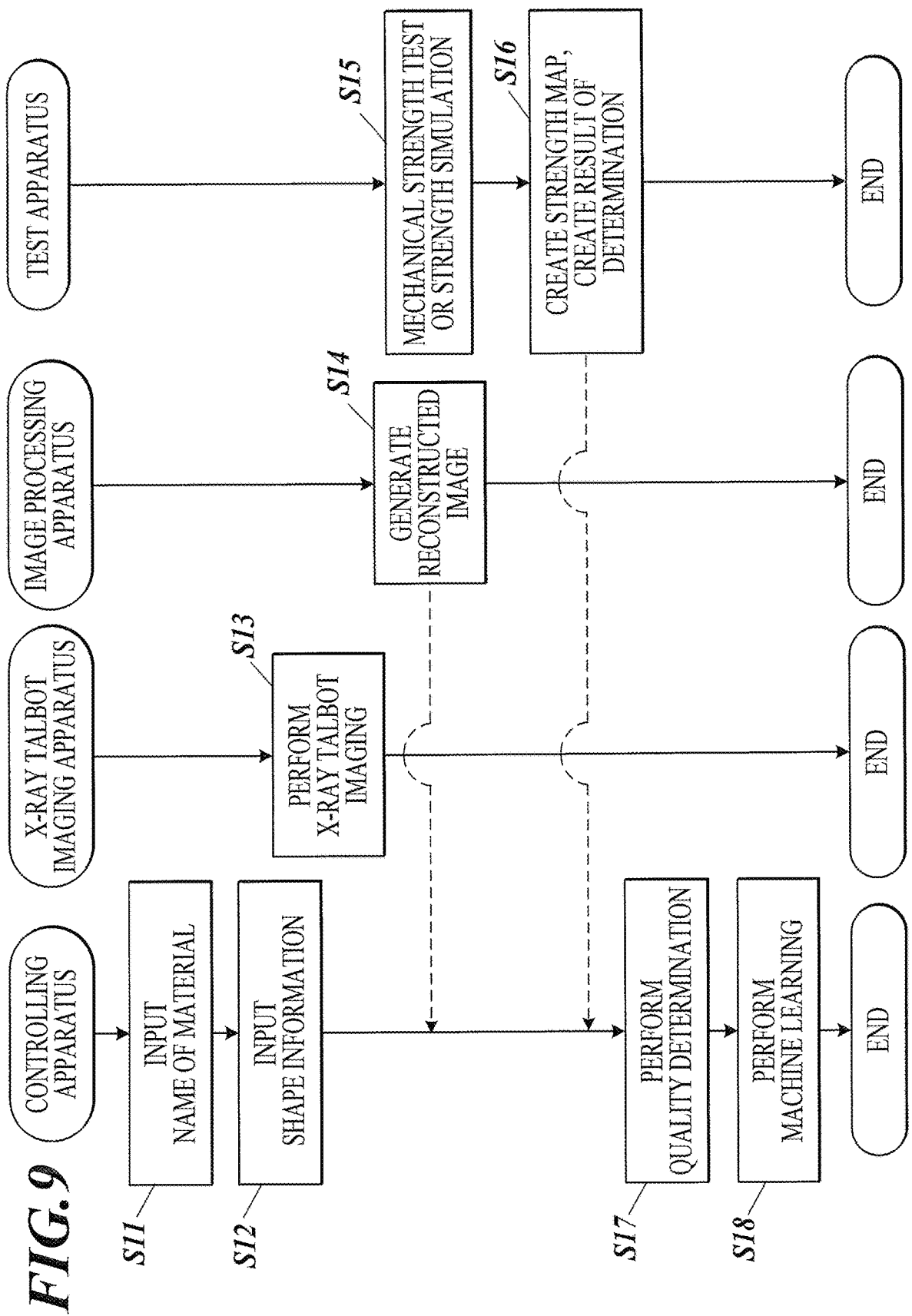
FIG. 9 is a flowchart showing machine learning.

The flow of the mechanical learning of the modification is described with reference to FIG. 9. First, in order to specify the material (composite material) included in the examined target is the object H, the name of the material is input on the input unit 24 or the external data input unit 25 (step S11).

Next, in order to specify the shape information (thickness information) of the material included in the examined target which is the object H, the shape information of the material is input on the input unit 24 or the external data input unit 25 (step S12).

Next, the X-ray Talbot imaging apparatus 1 images the area of interest in the examined target as the object H and obtains the moire image Mo (step S13).

Next, the image processing apparatus 2 processes the image signal of the moire image Mo imaged by the X-ray Talbot imaging apparatus 1, and based on the moire image Mo, the reconstructed image such as the absorption image, diffusion phase image, and the small-angle scattering image are generated (step S14).

Next, the mechanical strength test of the examined target or the strength simulation is performed in the mechanical strength test apparatus or the virtual test environment in the computer (step S15). Then, as a result, the strength map or the determination result of the simulation is obtained (step S16).

Next, the quality determination is performed based on the determination reference set for the mechanical strength (step S17). Next, the process advances to step S18, and the result up to this process is to be the teaching data and the mechanical learning process is performed.

According to this flow, the mechanical learning can be performed for the quality determination of the examined target.

Other than the result of passed and failed, numeric value information of the strength can be included in the quality determination of the examined target. The result of the mechanical learning (learning parameter) is input in the determining device (for example, general purpose computer apparatus) to perform the quality determination by the AI in the process of the quality determination using the machine learning result as shown in FIG. 10.

Figure 10:
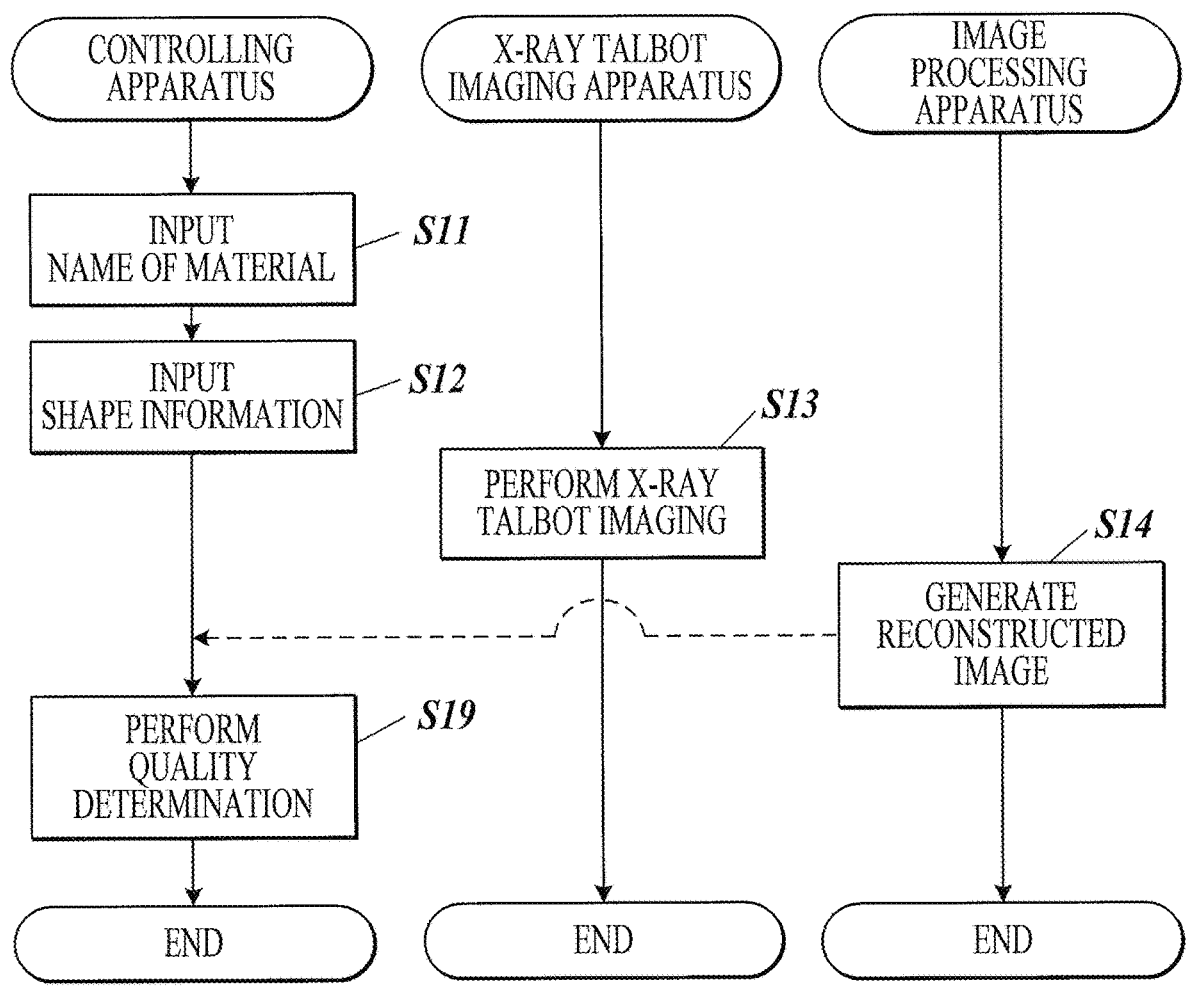
FIG. 10 is a flowchart showing a quality determination process when a machine learning function is used.

FIG. 10 shows a flow of the quality determination using the machine learning result. In steps S11 to S14, similar to the flow of the machine learning shown in FIG. 9, after the information of the material name or the type of the examined target and the shape information are input, the moire image Mo obtained by performing the imaging of the area of interest is used to generate the reconstructed image such as the diffusion phase image and the small-angle scattering image (steps S11 to step S14).

Then, the quality determination (step S19) by the AI which performed the machine learning is performed to determine the quality of the examined target.

According to the modification, the controlling apparatus 20 includes a machine learning function, and the controlling apparatus 20 performs the quality determination of the examined target without using the first database 23*a* and the second database 23*b* based on the teaching data associated and accumulated by the machine learning function, the data including the reconfigured image obtained by the X-ray Talbot imaging apparatus, the test data obtained by various tests actually performed on the examined target after imaging, and the shape information of the material included in the examined target. According to such machine learning function, the accuracy of estimating the signal strength from the reconstructed image is enhanced each time the process is used. Moreover, the examination is performed without referring to the first database 23a and the second database 23b. Therefore, the speed of the examination can be enhanced.

[Modification 2]

The controlling apparatus 20 according to the present modification includes a machine learning function. A combination of a plurality of types of evaluation indexes are associated by the machine learning function to perform the quality determination of the examined target.

Examples of the various types of evaluation indexes include information regarding the relation of the mechanical strength for the evaluation indexes that are clear from the test result of various tests as described above (modification 1) performed on the examined target for various sets of quality information such as crack density, material density, fiber orientation degree, and fiber density.

That is, when the quality determination is performed, in addition to the quality information such as the crack density and the mechanical strength, other information is also considered, and a composite evaluation is possible.

FIG. 5B shows a state to perform the quality determination of the mechanical strength for the crack density and the fiber orientation degree, but according to the present modification, when other information is also considered, a complex and multidimensional quality determination can be performed.

Further, the determination can be made more flexibly, and even if the one evaluation among the plurality of types of evaluation indexes failed, if the other evaluation indexes passed, the examined target may be considered to be a conforming product. With this, the yield can be enhanced.

Although embodiments of the present invention have been described and illustrated in detail, the disclosed embodiments are made for purposes of illustration and example only and not limitation. The scope of the present invention should be interpreted by terms of the appended claims.

What is claimed is:

1. An X-ray imaging system comprising:
an X-ray Talbot imaging apparatus including:
an X-ray source,
a plurality of gratings, and
an X-ray detector provided aligned in an X-ray irradiating axis direction,
wherein an X-ray is irradiated from the X-ray source through an examined target which is an object, through the plurality of gratings and to the X-ray detector to obtain a moire image necessary to generate a reconstructed image of the examined target;
a controller; and
a first database which shows, for each name or type of material, a correlation between information regarding a signal strength in the reconstructed image generated based on the moire image and quality information of the material included in the examined target,
a second database which shows, for each name or type of material, a correlation between the quality information of the material and information regarding mechanical strength of the material corresponding to the quality information,
wherein the controller estimates as the evaluation index the mechanical strength in the area of interest in the examined target based on the quality information regarding an area of interest in the examined target from the reconstructed image based on information regarding the input name or the type of material and input shape information and the first database, and based on information regarding the name or the type of the material and the shape information and the second database.

2. The X-ray imaging system according to claim 1, wherein the controller automatically performs a pass/fail determination for the material with the mechanical strength based on a determination reference of the mechanical strength set by the user; and
the controller displays on the reconstructed image a failed area in the material based on a determination result of the pass/fail determination with the mechanical strength.

3. The X-ray imaging system according to claim 1, wherein,
the shape information of the material is thickness information,
the quality information of the material includes a type of quality information in which a signal strength in the reconstructed image changes in proportion with the thickness information of the material,
the first database corresponds to the thickness information of the material, and
when input of new thickness information is received, the controller uses the thickness information of the material stored in the first database to estimate an evaluation index corresponding to the new thickness information.

4. The X-ray imaging system according to claim 1, wherein,
when the moire image of the examined target is obtained, the X-ray Talbot imaging apparatus rotates the examined target around an axis of the X-ray irradiating axis to image the examined target and the signal strength of the grating related to the examined target with relation to the rotating angle is stored,
the examined target includes a fiber which enhances strength of the examined target,
in the first database, the information regarding the signal strength in the reconstructed image includes information regarding angle dependency of change in the signal strength in the reconstructed image and the quality information includes quality information regarding an orientation degree of the fiber and fiber density, and
the controller estimates as the evaluation index in the area of interest in the examined target the fiber orientation degree and the fiber density in the area of interest in the examined target.

5. The X-ray imaging system according to claim 4, wherein the controller combines with an arithmetic process the reconstructed images obtained by imaging with a plurality of angles and extracts an in-plane distribution of a ratio of the plurality of target fiber orientation degrees and/or the in-plane distribution of the fiber density.

6. The X-ray imaging system according to claim 5, wherein the controller displays in a simplified state a distribution of the signal strength in the reconstructed image according to a signal allocating reference set by the user and extracts with emphasis a boundary of a trend or distribution of the ratio of the fiber orientation degrees and/or the fiber density in the plane.

7. The X-ray imaging system according to claim 4, further comprising a second database showing, for each name or type of material, a correlation between the quality information of the material and the information regarding the mechanical strength corresponding to the quality information, wherein,
the controller estimates as the evaluation index the mechanical strength in the area of interest of the examined target based on information regarding the name or the type of the material and the shape information and the second database,
in the second database, the quality information of the material includes information regarding the fiber orientation degree and/or the fiber density, and the information regarding the mechanical strength corresponding to the quality information includes information regarding the mechanical strength corresponding to the fiber orientation degree and/or the fiber density, and
the controller estimates as the evaluation index in the area of interest in the examined target the mechanical strength based on the fiber orientation degree and/or the fiber density.

8. The X-ray imaging system according to claim 1, wherein,
the controller includes a machine learning function, and
the controller performs a quality determination of the examined target or an estimate of strength without using the first database or the second database by associating by the machine learning function teaching data including the reconstructed image obtained by the X-ray Talbot imaging apparatus, test data obtained by various tests actually performed on the examined target after imaging, the name and type of the material included in the examined target and a quality determination result with shape information.

9. The X-ray imaging system according to claim 1, wherein the controller includes a machine learning function and the controller associates a combination of a plurality of types of evaluation indexes using the machine learning function to perform the quality determination of the examined target.

10. The X-ray imaging system according to claim 1, wherein the controller discriminates signal strength due to the quality information of the examined target with signal strength due to a shape of the examined target based on the reconstructed image and the input shape information of the material.

11. The X-ray imaging system according to claim 1, wherein the controller specifies in advance an examined target range for the examined target itself or the material included in the examined target.

* * * * *